US012597554B2

(12) United States Patent
Yoshikawa et al.

(10) Patent No.: US 12,597,554 B2
(45) Date of Patent: Apr. 7, 2026

(54) ELECTRONIC COMPONENT

(71) Applicant: TDK Corporation, Tokyo (JP)

(72) Inventors: Kazuhiro Yoshikawa, Tokyo (JP);
Takeshi Oohashi, Tokyo (JP);
Mitsuhiro Tomikawa, Tokyo (JP);
Koichi Tsunoda, Tokyo (JP)

(73) Assignee: TDK Corporation, Tokyo (JP)

( * ) Notice: Subject to any disclaimer, the term of this
patent is extended or adjusted under 35
U.S.C. 154(b) by 790 days.

(21) Appl. No.: 17/896,744

(22) Filed: Aug. 26, 2022

(65) Prior Publication Data

US 2023/0060995 A1     Mar. 2, 2023

(30) Foreign Application Priority Data

Aug. 31, 2021     (JP) ................................. 2021-140988

(51) Int. Cl.
*H01F 27/29* (2006.01)
*H01F 17/00* (2006.01)
*H01G 4/38* (2006.01)

(52) U.S. Cl.
CPC ....... H01F 27/292 (2013.01); H01F 17/0013
(2013.01); H01G 4/38 (2013.01)

(58) Field of Classification Search
CPC .............. H01F 27/292; H01F 17/0013; H01F
2017/0026; H01F 2017/0086; H01F
27/2804; H01F 27/2809; H01G 4/38;
H01G 4/228; H01G 4/40
See application file for complete search history.

(56) References Cited

U.S. PATENT DOCUMENTS

| | | | | |
|---|---|---|---|---|
| 6,885,276 B2 * | 4/2005 | Iha | ........................ | G03F 7/0047 |
| | | | | 336/200 |
| 2007/0069844 A1 * | 3/2007 | Kudo | .................. | H01F 17/0013 |
| | | | | 336/83 |
| 2008/0023219 A1 | 1/2008 | Yoshizawa et al. | | |
| 2015/0109074 A1 * | 4/2015 | Son | ...................... | H03H 7/0115 |
| | | | | 333/185 |
| 2016/0049254 A1 * | 2/2016 | Sugita | .................. | H01G 4/1218 |
| | | | | 361/301.4 |
| 2016/0099102 A1 * | 4/2016 | Matsunaga | ........... | H01F 27/402 |
| | | | | 336/105 |
| 2016/0268050 A1 * | 9/2016 | Hattori | ................... | H01C 1/012 |
| 2018/0351529 A1 * | 12/2018 | Miyahara | ................ | H01F 27/29 |
| 2020/0082964 A1 * | 3/2020 | Sakamoto | ................. | H01F 1/24 |
| 2021/0159017 A1 * | 5/2021 | Son | ........................ | H01G 4/248 |

(Continued)

FOREIGN PATENT DOCUMENTS

| | | | |
|---|---|---|---|
| JP | 2002-324730 | * | 11/2002 |
| JP | 2008-034626 A | | 2/2008 |

*Primary Examiner* — Mang Tin Bik Lian
(74) *Attorney, Agent, or Firm* — Rimon P.C.

(57) ABSTRACT

Disclosed herein is an electronic component that includes an
element body having a structure in which a plurality of
conductor layers are stacked in a first direction on a surface
of a substrate with insulating layers interposed therebe-
tween, and a plurality of terminal electrodes provided on a
mounting surface of the element body. The mounting surface
extends in the first direction and in a second direction
perpendicular to the first direction. The element body
includes an inductor constituted by the plurality of conduc-
tor layers and has a coil axis extending in a third direction
perpendicular to both the first and second directions.

19 Claims, 4 Drawing Sheets

(56) References Cited

U.S. PATENT DOCUMENTS

| | | | | |
|---|---|---|---|---|
| 2021/0305231 A1* | 9/2021 | Oba | .......................... | H10D 1/20 |
| 2021/0398730 A1* | 12/2021 | Yoshioka | ................ | H01F 41/12 |
| 2023/0052086 A1* | 2/2023 | Arai | ........................ | H01F 17/04 |

* cited by examiner

ELECTRONIC COMPONENT

BACKGROUND OF THE INVENTION

Field of the Invention

The present invention relates to an electronic component and, more particularly, to a chip-type electronic component including an inductor.

Description of Related Art

As a chip-type electronic component incorporating an inductor, an electronic component described in JP 2008-034626A is known. In the electronic component described in JP 2008-034626A, a spiral conductor pattern formed in a predetermined conductor layer functions as an inductor.

However, in the electronic component 1 described in JP 2008-034626A, it is necessary to increase the area of a substrate in order to increase the coil diameter of the inductor. Thus, when multiple electronic components are intended to be produced using an aggregate substrate, the number of the electronic components to be obtained would be inevitably small.

SUMMARY

It is therefore an object of the present invention to increase the coil diameter of an inductor without reducing the number of electronic components to be produced from an aggregate substrate.

An electronic component according to the present invention includes: an element body having a structure in which a plurality of conductor layers are stacked in a first direction on the surface of a substrate with insulating layers interposed therebetween; and a plurality of terminal electrodes provided on a mounting surface of the element body. The mounting surface extends in the first direction and in a second direction perpendicular to the first direction. The element body includes an inductor constituted by the plurality of conductor layers and has a coil axis extending in a third direction perpendicular to both the first and second directions.

According to the present invention, the inductor is erected with respect to the substrate such that the coil axis extends in a direction perpendicular to the first direction in which the conductor layers are stacked, so that it is possible to increase the coil diameter of the inductor without involving an increase in the substrate area, which in turn makes it possible to increase the coil diameter of the inductor without reducing the number of electronic components to be obtained.

In the present invention, the inductor may include a horizontal section in which a conductor pattern included in a predetermined conductor layer of the plurality of conductor layers extends in the second direction and a vertical section in which conductor patterns included in the plurality of conductor layers are connected to each other in the first direction through a through hole conductor. With this configuration, it is possible to increase the length of the vertical section by increasing the number of the conductor layers or increasing the depth of the through hole conductor.

In the present invention, the element body may further include a capacitor having conductor patterns included respectively in two conductor layers, which are adjacent in the first direction, of the plurality of conductor layers and a capacitive insulating film positioned between the two conductor layers. With this configuration, an LC composite component such as a band-pass filter can be constituted. In this case, one of the two conductor layers may be positioned closest to the substrate. This can maintain flatness of the conductor pattern constituting the capacitor. Further, in this case, at least one of the plurality of terminal electrodes may partly overlap the substrate. This can ensure a sufficient area for the terminal electrode.

In the present invention, the side surfaces of the element body extending in the second and third directions may be smaller in area than the mounting surface. This configuration allows a sufficient number of electronic components to be produced as a result of the fabrication of multiple electronic components at a time using an aggregate substrate.

As described above, according to the present invention, it is possible to increase the coil diameter of the inductor without reducing the number of electronic components to be produced from an aggregate substrate.

BRIEF DESCRIPTION OF THE DRAWINGS

The above and other objects, features and advantages of this invention will become more apparent by reference to the following detailed description of the invention taken in conjunction with the accompanying drawings, wherein:

FIG. 2A illustrates the xz cross section, and where FIG. 2B illustrates the yz cross section;

DETAILED DESCRIPTION OF THE EMBODIMENTS

Preferred embodiments of the present invention will now be explained in detail with reference to the drawings.

Figure 1:
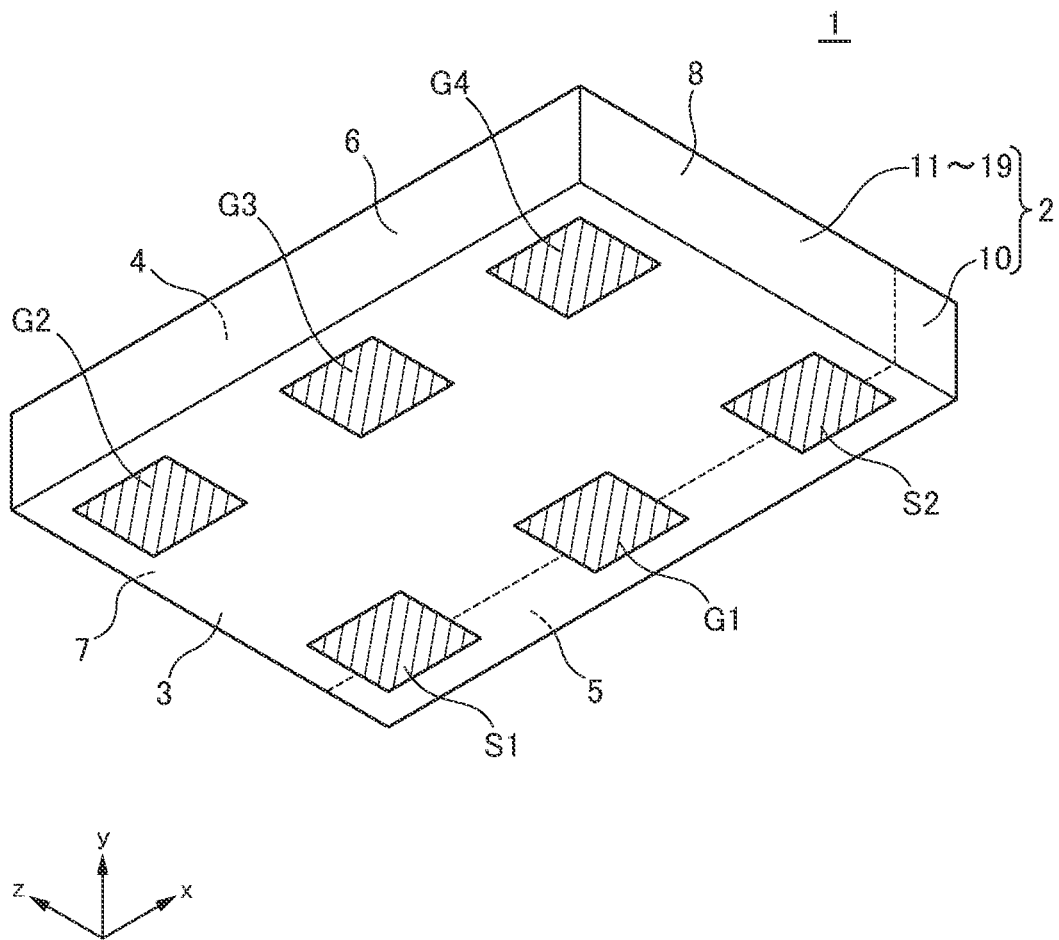
FIG. 1 is a schematic perspective view illustrating the outer appearance of an electronic component 1 according to an embodiment of the present invention.

FIG. 1 is a schematic perspective view illustrating the outer appearance of an electronic component 1 according to an embodiment of the present invention.

The electronic component 1 according to the present embodiment is a chip-type LC composite component functioning as a band-pass filter and includes, as illustrated in FIG. 1, an element body 2 and a plurality of terminal electrodes provided on the surface of the element body 2. The terminal electrodes include two signal terminals S1, S2 and four ground terminals G1 to G4. The element body 2 has a mounting surface 3 and an upper surface 4 that constitute the xz plane and are positioned on the sides opposite to each other, side surfaces 5 and 6 that constitute the xy plane and are positioned on the sides opposite to each other, and side surfaces 7 and 8 that constitute the yz plane and are positioned on the sides opposite to each other. The terminal electrodes are provided on the mounting surface 3. The side surfaces 5 to 8 are smaller in area than the mounting surface 3. The element body 2 includes a substrate 10 constituting the side surface 5 and a plurality of insulating layers 11 to 19 stacked in the z-direction on the surface of the substrate 10. As will be described later, inside the element body 2, a plurality of conductor layers are stacked in the z-direction through the insulating layers.

Figures 2A, 2B:
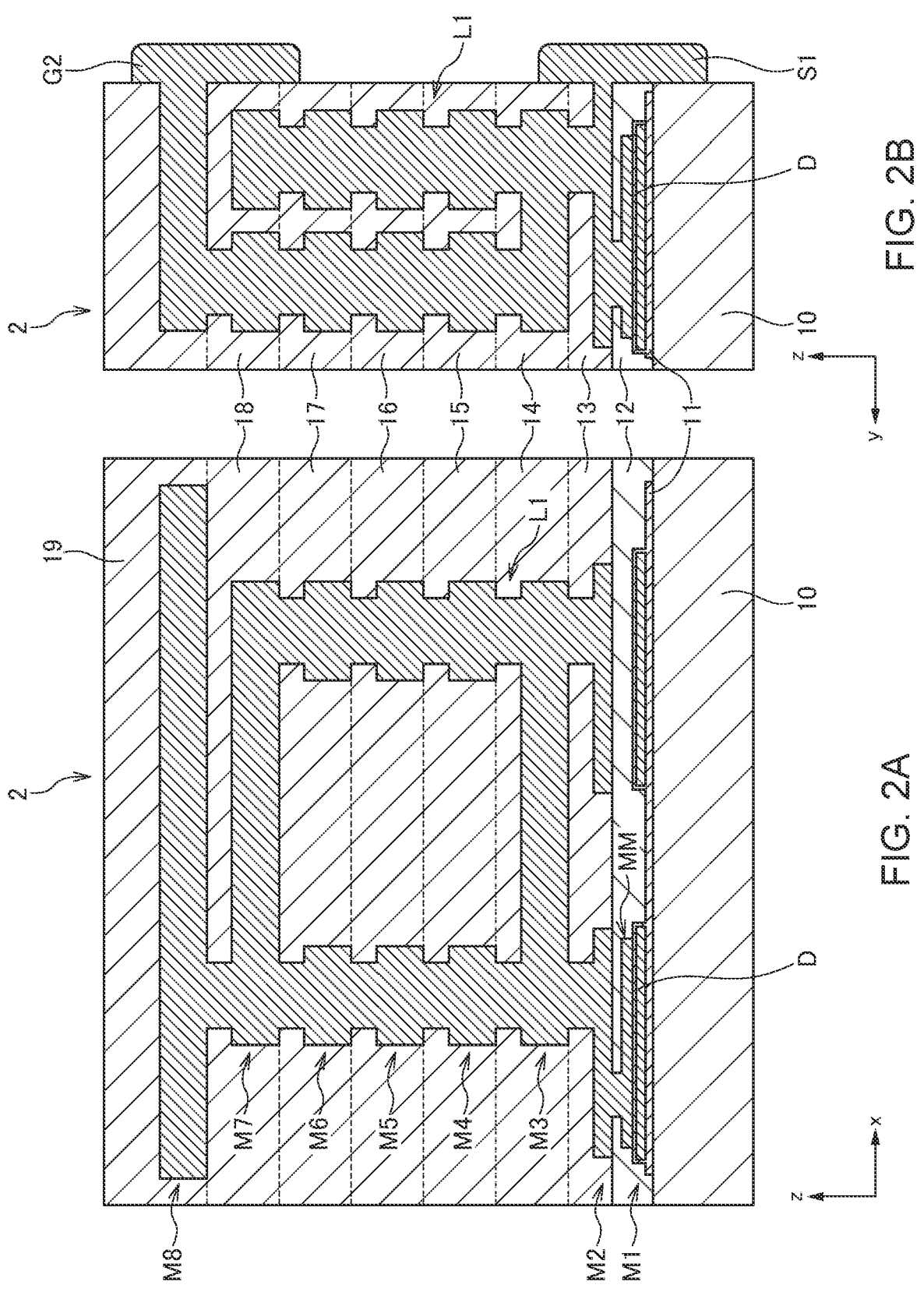
FIGS. 2A and 2B are schematic cross-sectional views of the electronic component 1, where
Figure 3:
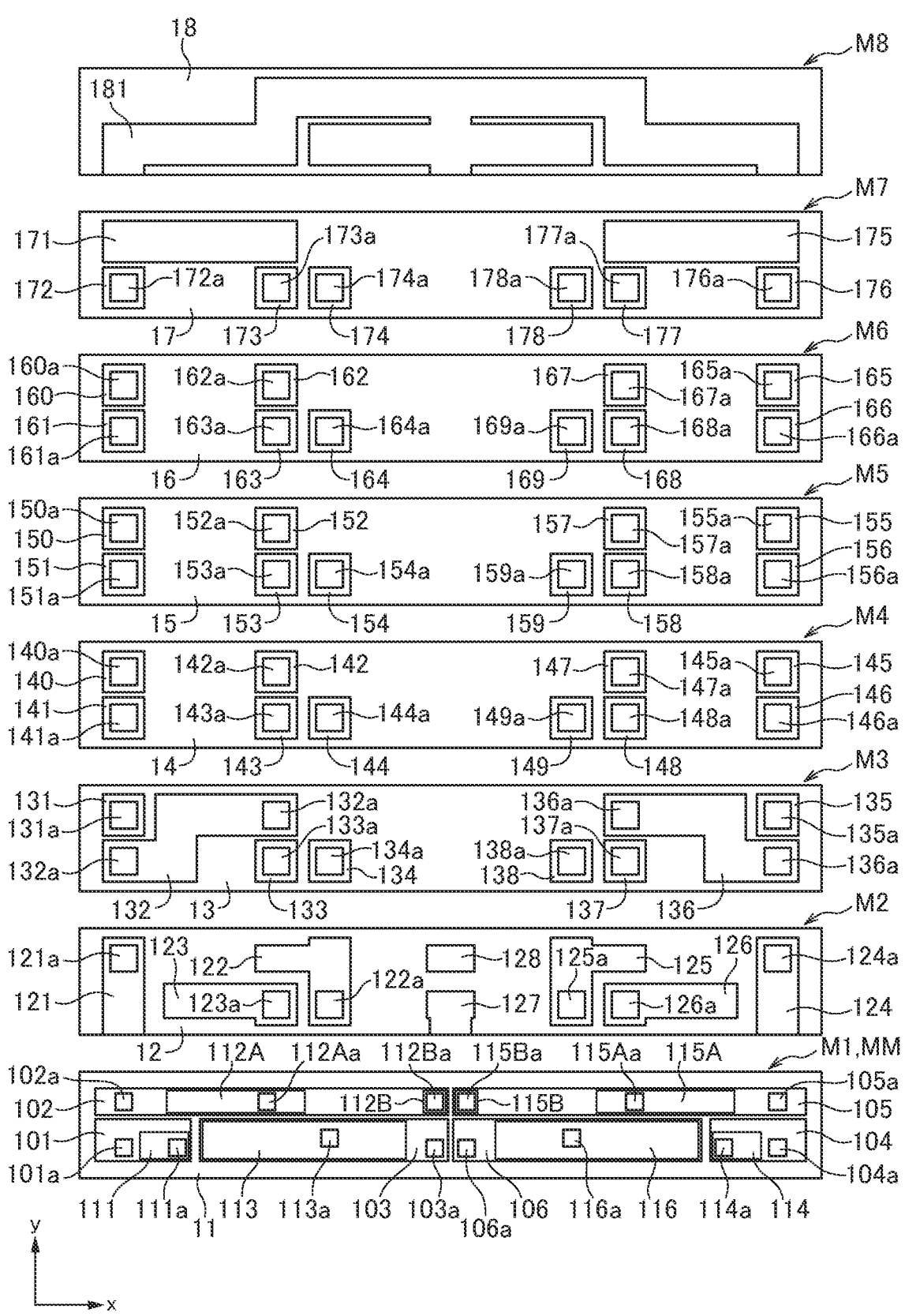
FIG. 3 is a schematic plan view illustrating a pattern shape of each of the conductor layers provided inside the element body 2.

FIGS. 2A and 2B are schematic cross-sectional views of the electronic component 1. FIG. 2A illustrates the xz cross section, and FIG. 2B illustrates the yz cross section. FIG. 3 is a schematic plan view illustrating a pattern shape of each of the conductor layers provided inside the element body 2.

As illustrated in FIGS. 2A, 2B, and 3, conductor layers M1, MM, and M2 to M8 are provided inside the element body 2. The conductor layer M1 is a lowermost conductor layer formed on the surface of the insulating layer 11 covering the substrate 10 and includes conductor patterns 101 to 106. The conductor patterns 101 to 106 are connected to the conductor layer M2 above the first conductor layer M1 through through hole conductors 101a to 106a penetrating the insulating layer 12. The conductor patterns 101 to 106 are covered with a capacitive insulating film D of a capacitor.

The conductor layer MM incudes conductor patterns 111, 113, 114, and 116 covering respectively the conductor patterns 101, 103, 104, and 106 through the capacitive insulating film D, conductor patterns 112A and 112B covering the conductor pattern 102 through the capacitive insulating film D, and conductor patterns 115A and 115B covering the conductor pattern 105 through the capacitive insulating film D. The conductor patterns 111, 112A, 112B, 113, 114, 115A, 115B, and 116 are connected to the conductor layer M2 above the conductor layer MM through through hole conductors 111a, 112Aa, 112Ba, 113a, 114a, 115Aa, 115Ba, and 116a.

The conductor layer M2 includes conductor patterns 121 to 128 formed on the surface of the insulating layer 12. The conductor pattern 121 is connected to the conductor patterns 101 and 102 through the through hole conductors 101a and 102a. The conductor pattern 122 is connected to the conductor patterns 112A and 113 through the through hole conductors 112Aa and 113a. The conductor pattern 123 is connected to the conductor pattern 111 through the through hole conductor 111a. The conductor pattern 124 is connected to the conductor patterns 104 and 105 through the through hole conductors 104a and 105a. The conductor pattern 125 is connected to the conductor patterns 115A and 116 through the through hole conductors 115Aa and 116a. The conductor pattern 126 is connected to the conductor pattern 114 through the through hole conductor 114a. The conductor pattern 127 is connected to the conductor patterns 103 and 106 through the through hole conductors 103a and 106a. The conductor pattern 128 is connected to the conductor patterns 112B and 115B through the through hole conductors 112Ba and 115Ba. The conductor patterns 121 to 126 are connected to the conductor layer M3 above the conductor layer M2 through through holes 121a to 126a penetrating the insulating layer 13.

The conductor layer M3 includes conductor patterns 131 to 138 formed on the surface of the insulating layer 13. The conductor pattern 131 is connected to the conductor pattern 121 through the through hole conductor 121a. The conductor pattern 133 is connected to the conductor pattern 123 through the through hole conductor 123a. The conductor pattern 134 is connected to the conductor pattern 122 through the through hole conductor 122a. The conductor pattern 135 is connected to the conductor pattern 124 through the through hole conductor 124a. The conductor pattern 137 is connected to the conductor pattern 126 through the through hole conductor 126a. The conductor pattern 138 is connected to the conductor pattern 125 through the through hole conductor 125a. The conductor patterns 131 to 138 are connected to the conductor layer M4 above the conductor layer M3 through through holes 131a to 138a penetrating the insulating layer 14.

The conductor layer M4 includes conductor patterns 140 to 149 formed on the surface of the insulating layer 14. The conductor pattern 140 is connected to the conductor pattern 131 through the through hole conductor 131a. The conductor patterns 141 and 142 are connected to the conductor pattern 132 through the through hole conductor 132a. The conductor pattern 143 is connected to the conductor pattern 133 through the through hole conductor 133a. The conductor pattern 144 is connected to the conductor pattern 134 through the through hole conductor 134a. The conductor pattern 145 is connected to the conductor pattern 135 through the through hole conductor 135a. The conductor patterns 146 and 147 are connected to the conductor pattern 36 through the through hole conductor 136a. The conductor pattern 148 is connected to the conductor pattern 137 through the through hole conductor 137a. The conductor pattern 149 is connected to the conductor pattern 138 through the through hole conductor 138a. The conductor patterns 140 to 149 are connected to the conductor layer M5 above the conductor layer M4 through through holes 140a to 149a penetrating the insulating layer 15.

The conductor layer M5 includes conductor patterns 150 to 159 formed on the surface of the insulating layer 15. The conductor patterns 150 to 159 are connected respectively to the conductor patterns 140 to 149 through the through hole conductors 140a to 149a. The conductor patterns 150 to 159 are connected to the conductor layer M6 above the conductor layer M5 through through holes 150a to 159a penetrating the insulating layer 16.

The conductor layer M6 includes conductor patterns 160 to 169 formed on the surface of the insulating layer 16. The conductor patterns 160 to 169 are connected respectively to the conductor patterns 150 to 159 through the through hole conductors 150a to 159a. The conductor patterns 160 to 169 are connected to the conductor layer M7 above the conductor layer M6 through through holes 160a to 169a penetrating the insulating layer 17.

The conductor layer M7 includes conductor patterns 170 to 178 formed on the surface of the insulating layer 17. The conductor pattern 171 is connected to the conductor patterns 160 and 162 through the through hole conductors 160a and 162a. The conductor patterns 172 to 174 are connected respectively to the conductor patterns 161, 163, and 164 through the through hole conductors 161a, 163a, and 164a. The conductor pattern 175 is connected to the conductor patterns 165 and 167 through the through hole conductors 165a and 167a. The conductor patterns 176 to 178 are connected respectively to the conductor patterns 166, 168, and 169 through the through hole conductors 166a, 168a, and 169a. The conductor patterns 172, 174, 176, and 178 are connected to the conductor layer M8 above the conductor layer M7 through through hole conductors 172a, 174a, 176a, and 178a penetrating the insulating layer 18.

The conductor layer M8 includes a conductor pattern 181 formed on the surface of the insulating layer 18. The conductor pattern 181 is connected to the conductor patterns 172 to 174 and 176 to 178 through the through hole conductors 172a to 174a and 176a to 178a. The conductor pattern 181 is covered with the insulating layer 19 in the uppermost layer constituting the side surface 6 of the element body 2.

The conductor patterns 121, 124, and 127 are partly exposed to the mounting surface 3 of the element body 2 and connected respectively to the signal terminal S1, signal terminal S2, and ground terminal G1. The conductor pattern

181 is exposed to the mounting surface 3 of the element body 2 at three portions and connected to the ground terminals G2 to G4.

Figure 4:
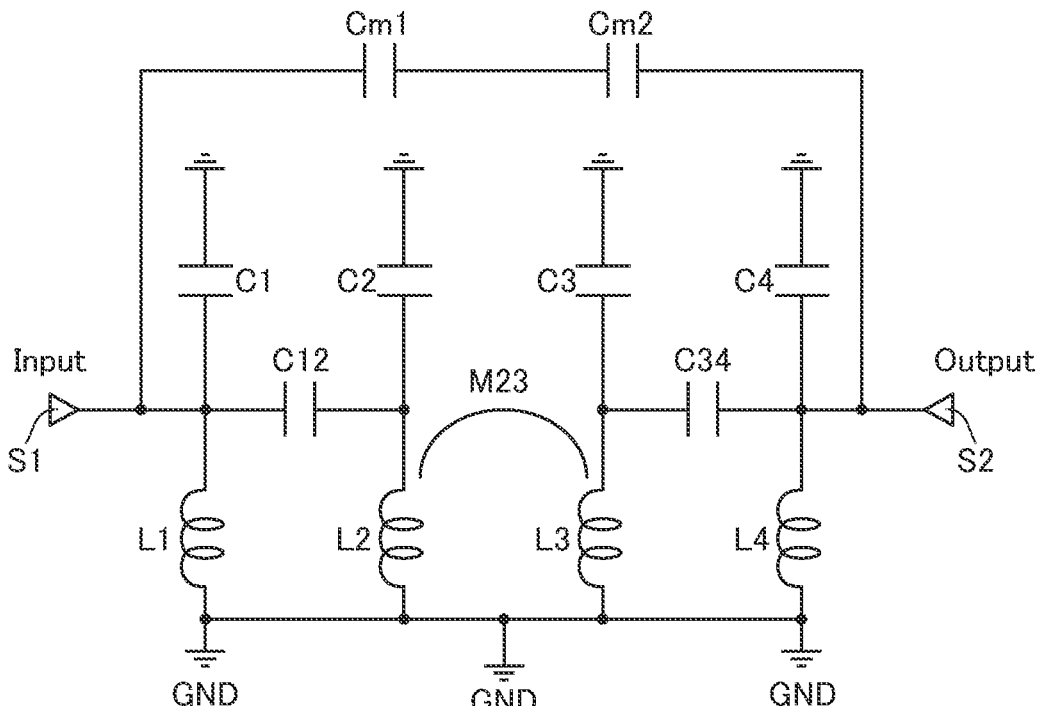
FIG. 4 is an equivalent circuit diagram of the electronic component 1.

FIG. 4 is an equivalent circuit diagram of the electronic component 1 according to the present embodiment.

As illustrated in FIG. 4, the electronic component 1 according to the present embodiment constitutes a band-pass filter having the signal terminal S1 as an input terminal and the signal terminal S2 as an output terminal. An inductor L1 illustrated in FIG. 4 includes the conductor patterns 121, 131, 140, 150, 160, 171, 162, 152, 142, 132, 141, 151, 161, 172, and 181 and the through hole conductors connecting them. An inductor L2 includes the conductor patterns 122, 134, 144, 154, 164, 174, and 181 and the through hole conductors connecting them. An inductor L3 includes the conductor patterns 125, 138, 149, 159, 169, 178, and 181 and the through hole conductors connecting them. An inductor L4 includes the conductor patterns 124, 135, 145, 155, 165, 175, 167, 157, 147, 136, 146, 156, 166, 176, and 181 and the through hole conductors connecting them.

The inductors L1 and L4 are helically wound in about 1.5 turns, and the coil axes thereof extend in the y-direction. A horizontal section of the inductor L1 that extends in the x-direction is constituted by the conductor pattern 132 positioned in the conductor layer M3 and the conductor pattern 171 positioned in the conductor layer M7, and a vertical section of the inductor L1 that extends in the z-direction is constituted by the through hole conductors and conductor patterns connected through the through hole conductors. A horizontal section of the inductor L4 that extends in the x-direction is constituted by the conductor pattern 136 positioned in the conductor layer M3 and the conductor pattern 175 positioned in the conductor layer M7, and a vertical section of the inductor L4 that extends in the z-direction is constituted by the through hole conductors and conductor patterns connected through the through hole conductors.

A capacitor C1 is constituted by the conductor patterns 101, 111 and the capacitive insulating film D positioned therebetween. A capacitor C2 is constituted by the conductor patterns 104, 114 and the capacitive insulating film D positioned therebetween. A capacitor C3 is constituted by the conductor patterns 103, 113 and the capacitive insulating film D positioned therebetween. A capacitor C4 is constituted by the conductor patterns 106, 116 and the capacitive insulating film D positioned therebetween. A capacitor C12 is constituted by the conductor patterns 102, 112A and the capacitive insulating film D positioned therebetween. A capacitor C34 is constituted by the conductor patterns 105, 115A and the capacitive insulating film D positioned therebetween. A capacitor Cm1 is constituted by the conductor patterns 102, 112B and the capacitive insulating film D positioned therebetween. A capacitor Cm2 is constituted by the conductor patterns 105, 115B and the capacitive insulating film D positioned therebetween. As described above, the conductor layer M1 positioned in the lowermost layer closest to the substrate 10 is used as a lower electrode for the capacitors C1 to C4, C12, C34, Cm1, and Cm2, so that flatness of the capacitor can be maintained to increase reliability.

As described above, unlike typical electronic components, the electronic component 1 according to the present embodiment has a configuration in which the coil axes of the inductors L1 and L4 extend perpendicular to the stacking direction, so that it is possible to increase the diameter of the coils of the inductors L1 and L4 without an increase in the area of the substrate 10 by increasing the number of conductor layers or increasing the thickness of the conductor layer or through hole conductor in the z-direction. Therefore, when multiple electronic components 1 are intended to be produced by dividing an aggregate substrate into individual pieces, the number of the electronic components 1 to be obtained is not reduced. Further, the signal terminals S1, S2 and ground terminal G1 are disposed so as to partly overlap the substrate 10, so that a sufficient area can be ensured therefor.

While the preferred embodiment of the present invention has been described, the present invention is not limited to the above embodiment, and various modifications may be made within the scope of the present invention, and all such modifications are included in the present invention.

What is claimed is:

1. An electronic component comprising:
   an element body including a substrate and a plurality of conductor layers stacked in a first direction on a surface of the substrate with insulating layers interposed between the conductor layers, the surface of the substrate extending in a second direction perpendicular to the first direction and a third direction perpendicular to both the first and second directions; and
   a plurality of terminal electrodes provided on a mounting surface of the element body,
   wherein the mounting surface extends in the first direction and in the second direction, and
   wherein the element body includes an inductor constituted by the plurality of conductor layers and has a coil axis extending in the third direction.

2. The electronic component as claimed in claim 1, wherein the inductor includes a horizontal section in which a conductor pattern included in a predetermined conductor layer of the plurality of conductor layers extends in the second direction and a vertical section in which conductor patterns included in the plurality of conductor layers are connected to each other in the first direction through a through hole conductor.

3. The electronic component as claimed in claim 1, wherein the element body further includes a capacitor having:
   conductor patterns included respectively in two conductor layers, which are adjacent in the first direction, of the plurality of conductor layers; and
   a capacitive insulating film positioned between the two conductor layers.

4. The electronic component as claimed in claim 3, wherein one of the two conductor layers is positioned closest to the substrate.

5. The electronic component as claimed in claim 4, wherein at least one of the plurality of terminal electrodes partly overlap the substrate.

6. The electronic component as claimed in claim 1, wherein a side surface of the element body extending in the second and third directions is smaller in area than the mounting surface.

7. An electronic component comprising:
   a first element body having a first side surface extending in a first direction and in a second direction perpendicular to the first direction and a top surface extending in the second direction and in a third direction perpendicular to the first and second directions;
   a second element body provided on the top surface of the first element body; and
   a plurality of terminal electrodes, wherein the second element body includes an electric element and a plurality of insulating layers stacked in the first direction and embedding the electric element therein, wherein the second element body has a second side surface substantially coplanar with the first side surface of the first element body, and wherein the plurality of terminal electrodes includes a first terminal electrode provided over the first and second side surfaces such that a boundary of the first element body and the second element body is covered with the first terminal electrode, and a second terminal electrode provided on the second side surface so as not to cover the boundary.

8. The electronic component as claimed in claim 7, wherein the first and second terminal electrodes are arranged in the first direction.

9. The electronic component as claimed in claim 7, wherein the second side surface is greater in area than the top surface.

10. The electronic component as claimed in claim 9, wherein the second side surface is greater in area than the first side surface.

11. The electronic component as claimed in claim 7, wherein the electric element includes an inductor having a coil axis that extends in the third direction.

12. The electronic component as claimed in claim 11, wherein the electric element further includes a capacitor.

13. The electronic component as claimed in claim 7, wherein the first element body further has a third side surface opposite to the first side surface, wherein the second element body further has a fourth side surface opposite to the second side surface, and wherein each of the third and fourth side surfaces is free from a terminal electrode.

14. The electronic component as claimed in claim 12, wherein the capacitor is arranged between the first element body and the inductor in the first direction.

15. An electronic component comprising:

a first element body having a first side surface extending in a first direction and in a second direction perpendicular to the first direction and a top surface extending in the second direction and in a third direction perpendicular to the first and second directions;

a second element body provided on the top surface of the first element body; and a plurality of terminal electrodes, wherein the second element body includes an electric element and a plurality of insulating layers stacked in the first direction and embedding the electric element therein, wherein the second element body has a second side surface substantially coplanar with the first side surface of the first element body, wherein the plurality of terminal electrodes are provided on the second side surface of the element body, wherein the second side surface is greater in area than the top surface, and wherein the electric element includes an inductor having a coil axis that extends in the third direction.

16. The electronic component as claimed in claim 15, wherein the second side surface is greater in area than the first side surface.

17. The electronic component as claimed in claim 15, wherein the electric element further includes a capacitor.

18. The electronic component as claimed in claim 17, wherein the capacitor is arranged between the first element body and the inductor in the first direction.

19. The electronic component as claimed in claim 15, wherein the first element body further has a third side surface opposite to the first side surface, wherein the second element body further has a fourth side surface opposite to the second side surface, and wherein each of the third and fourth side surfaces is free from a terminal electrode.

* * * * *